United States Patent
Bracegirdle

(10) Patent No.: US 6,299,380 B1
(45) Date of Patent: Oct. 9, 2001

(54) PROCESS FOR TREATING DREDGE DETRITUS

(76) Inventor: Paul E. Bracegirdle, 9 Crimson Leaf Dr., Newtown, PA (US) 18940

(*) Notice: Subject to any disclaimer, the term of this patent is extended or adjusted under 35 U.S.C. 154(b) by 0 days.

(21) Appl. No.: 09/370,725

(22) Filed: Aug. 7, 1999

Related U.S. Application Data

(60) Provisional application No. 60/097,243, filed on Aug. 20, 1998.

(51) Int. Cl.[7] ............................................. B09B 1/00
(52) U.S. Cl. ................................... 405/129.1; 405/128.5; 405/129.25; 405/263; 210/170; 210/747; 209/10
(58) Field of Search .................................. 405/128, 129, 405/263–266, 303, 128.1, 128.15, 128.45, 128.5, 128.7, 129.1, 129.25; 210/170, 747, 723, 901; 37/337, 343, 357, 386, 387; 171/18, 95, 98, 128, 129; 299/9; 209/2, 10, 38; 366/44, 47

(56) References Cited

U.S. PATENT DOCUMENTS

| | | | |
|---|---|---|---|
| 1,864,926 | * | 6/1932 | Moss et al. ................... 210/170 X |
| 4,335,974 | * | 6/1982 | Wirtgen ........................ 405/129 X |
| 4,501,446 | * | 2/1985 | Glaser et al. ................. 210/747 X |
| 4,541,927 | * | 9/1985 | Breidenbaugh ............... 210/170 X |
| 4,601,832 | * | 7/1986 | Hooykaas ..................... 405/129 X |
| 5,039,226 | * | 8/1991 | Lavoie ............................... 366/44 |
| 5,067,740 | * | 11/1991 | Christenson ..................... 280/407 |
| 5,421,105 | * | 6/1995 | Schulte ........................ 405/303 X |
| 5,449,464 | * | 9/1995 | El-Shall ............................ 210/727 |
| 5,492,401 | * | 2/1996 | Halsted ............................... 366/47 |
| 5,575,921 | * | 11/1996 | Askin et al. ..................... 210/710 |
| 5,614,094 | * | 3/1997 | Deister et al. .................... 210/388 |
| 5,968,461 | * | 10/1999 | El-Shoubary et al. ........... 423/109 |
| 6,042,305 | * | 3/2000 | Novich et al. ................... 405/266 |
| 6,149,811 | * | 11/2000 | Hodges et al. ................... 210/328 |
| 6,171,024 | * | 1/2001 | Curtis et al. ................ 405/263 X |
| 6,193,444 | * | 2/2001 | Jonninen ..................... 405/263 X |

FOREIGN PATENT DOCUMENTS

4234442-A1 * 4/1994 (DE) ................................ 405/154

* cited by examiner

Primary Examiner—David Bagnell
Assistant Examiner—Jong-Suk Lee
(74) Attorney, Agent, or Firm—Daniel Kramer

(57) ABSTRACT

A process and machine for receiving and processing to a transportable and usable condition, water soaked waste dredge removed from watery bodies. The process includes the steps of separating oversize material from the watery bulk waste, grinding organic oversize material to pulp, adding the pulp to the watery bulk, adding stabilizers to the bulk, conveying the aggregate to a transporting vehicle and performing the mixing process within the vehicle. The process further includes transporting the mixture to a point of use, spreading the mixture, spreading a pozzolanic binder on the mixture and mixing the binder with the mixture in situ.

15 Claims, 9 Drawing Sheets

(FIG. 9 SEC. V-V)

(FIG.5 SEC. VII-VII)

(FIG.6 SEC. VIII-VIII)

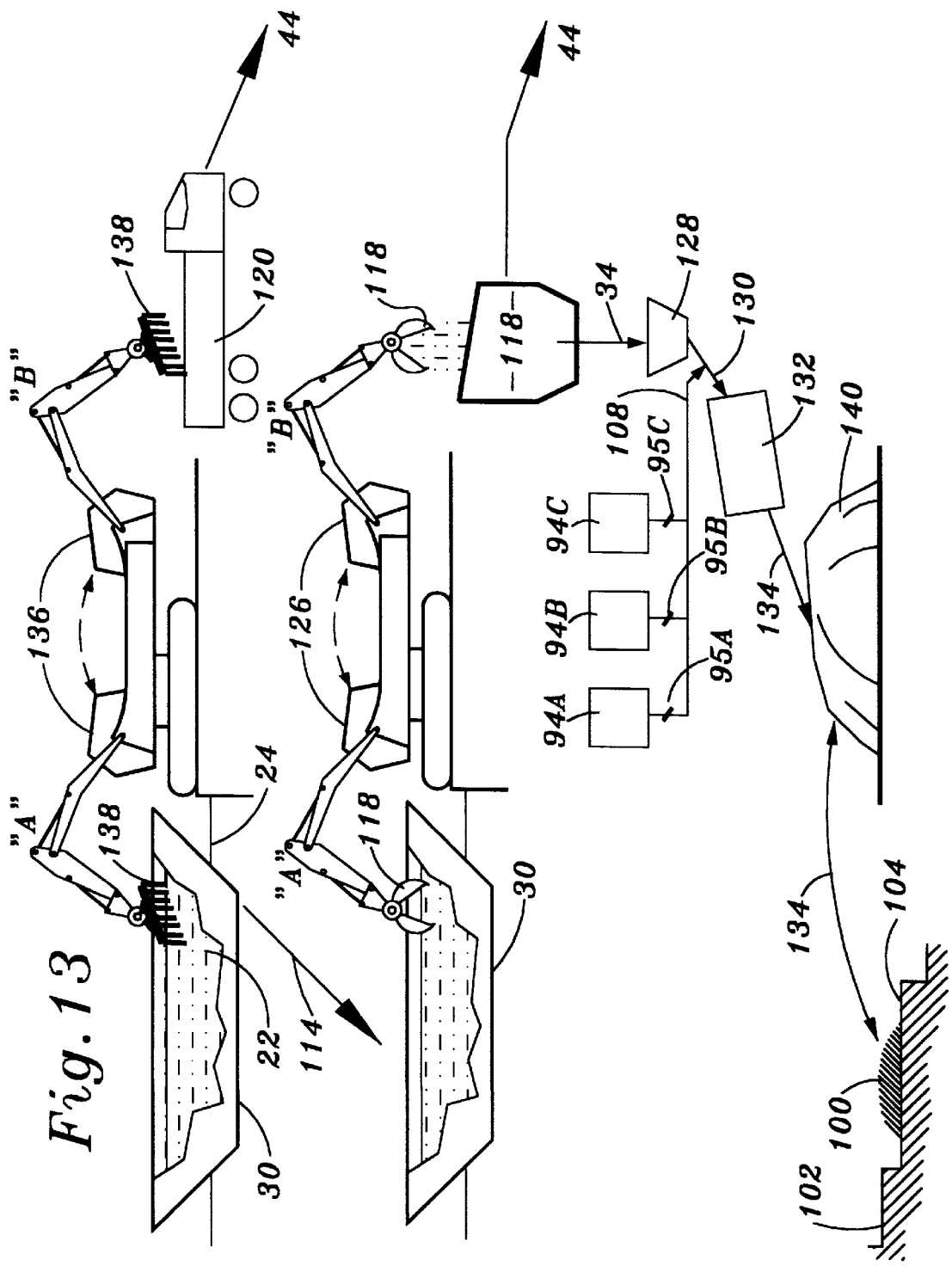

PROCESS FOR TREATING DREDGE DETRITUS

CROSS REFERENCE TO RELATED APPLICATIONS

Applicant claims priority of Provisional Application Serial No. 60/097,243 filed Aug. 20, 1998.

BACKGROUND

Bulk material removed from the bottom of bodies of water generally has water content exceeding 80 percent. The bulk material frequently carries with it gross or oversize organic material such as telephone poles, rotted pilings, abandoned and sunken vessels, metallic materials such as anchors, engine blocks, transmissions and nonmetallic material such as concrete blocks and portions of demolished structures.

At present the major disposal route for such dredged detritus is by truck to a nearby, or not so nearby, landfill. Such landfill disposal entails the considerable costs of transportation and tipping without the prospect of any economic return. However, there is a substantial and growing need for materials which can be employed for the reconstruction of abandoned mines and areas subject to erosion by wind or water. To effectively employ the dredge detritus for this purpose it must first be conditioned for transportation by forming a first mixture, then it must be conditioned for the final application by forming a second mixture.

OBJECTIVES

Therefore it is an object of the invention to provide an economical process for handling and treating dredge and other types of detritus and waste having a high water content and oversize organic materials, into material that meets transportation specifications and can be carried in transportation vehicles such as trucks or railway cars.

It is a further objective to provide such a process in which the oversize organic materials are pulped and added to the bulk of the watery material.

It is a further objective to provide a process which employs pozzolanic waste materials, such as fly ash and otherwise useless wastes such as bottoms, or ash from furnaces fired by coal or trash, which bottoms or ash materials otherwise would have to be disposed of in landfills, as additives for the purpose of conditioning the dredge detritus for transportation in a vehicle.

It is a further objective to provide a process in which the mixing of the ingredients is carried out in the transportation vehicle.

It is a further object to provide a machine which is adapted to mix the components within the transportation vehicle.

It is a further object to provide such a process where the ingredients are mixed within the transportation vehicle by a mixing machine whose entire mixing machine body fits and mixes within the vehicle while supported by wheels positioned outboard of the machine.

It is a further objective to provide a process in which the transported product is transformed into a second product by the addition of and mixing with a pozzolanic material; where this second product is suitable for application to a pit bench or shaft in a mine, or erosion reclaim process.

It is a further object to employ the same machine construction for in-place mixing the final ingredients at the mine bench as was employed for the in-car mixing prior to transportation to the site of utilization.

It is a further objective to improve the mixing machine by providing it also with rolling and compacting capability.

It is a further object to provide a process in which the dredge detritus loaded into a barge by the dredge and is simultaneously ground and mixed with a viscosity raising agent within the barge.

It is a further objective to provide such a process in which pozzolanic and conditioning agents are added to the ground and conditioned detritus and the mixture is further ground and mixed in a pugmill before being transported to and applied to an area to be reclaimed.

It is a further objective to provide a process in which oversized material is removed from the original barge carrier of the detritus by a raking process.

It is a further object to provide such a process in which the residue after raking is further prepared for final application by screening to remove yet unremoved oversized material, the undersized material being combined with a combination of pozzolanic materials and finally ground and mixed by processing through a pugmill.

Further objectives will become apparent as the nature and functioning of the process and the construction and application of the machine are disclosed in detail.

PRIOR ART

No patents or literature are known related to or describing a process for handling and treating dredge and other types of detritus and waste having a high water content and oversize organic materials, into a first material that meets transportation specifications and can be carried in trucks or railway cars and into a second material applicable to mine reconstruction.

High power grinding and mixing machines, resembling the novel mixing machine disclosed and employed in carrying out the objectives of the invention, are manufactured by the CMI Corporation of Oklahoma City, Okla. However, these machines all have wheels which are inboard of the cutting/mixing mandril and none have combined mixing and rolling/compacting capability. Grinders capable of being used in vessels such as barges are manufactured by Lang Tool Company of Beaverton, Mich.

Pugmills are manufactured by Pugmill Systems, Inc. Of Columbia, Tenn.

SUMMARY OF THE INVENTION

The invention provides several economical processes for handling and treating dredge and other types of detritus and waste having a high water content and oversize organic materials, into material that meets transportation specifications and can be carried in trucks or railway cars and applied to polluted and other areas to be reclaimed.

One process comprises the steps of:
1. Receiving detritus comprising about 80 percent of "undersize" material having a high water content with a predetermined maximum solids size and comprising 20 percent or less of oversize organic material having dimensions greater than the limit for undersize;
2. Separating the oversize from the undersize bulk;
3. Grinding the oversize to pulp having solids size no greater than the size of the solids in the undersize bulk;
4. Adding the pulp to the undersize bulk;
5. Adding binder to the bulk;
6. Conveying the bulk with the added pulp and binder to a carrier car having a top edge;

7. Positioning the carrier car under a wheeled mixing machine, the wheels of the mixing machine being positioned at substantially the level as the top edge of the carrier car, the mixing machine having a mixing mandril substantially the full width of the carrier car and having means for lowering the mandril to the bottom of the car and raising the mandril to clear the top edge of the car;
8. Operating the mandril to mix the bulk with the added ingredients while moving the mandril relative to the car length until the mandril has traversed substantially the entire length of the car; thereby preparing a first mixture having properties suitable for transportation;
9. Raising the mandril to clear the top edge of the car, thereby allowing the car, now bearing the mixed ingredients, to be moved and allowing another car to take its place under the mixing machine;
10. Conveying the mixture to the site of application and spreading it on the application site
11. Adding a pozzolanic material to the aggregate;
12. Mixing the first product with the pozzolanic material at the application site to form a second product, employing the same machine construction as employed for the in-car mixing.
13. Rolling and compacting the second product employing the dual function mixing machine.

A second process comprises the steps of:
1. Grinding the detritus within the original detritus conveyor, typically a barge, thereby reducing the size of the oversize material and simultaneously mixing the detritus with a viscosity improver as a transporation conditioner.
2. Transporting the ground and conditioned detritus to the place of use and there storing and, as needed, further conditioning the detritus with pozzolanic material and mixing and further grinding the mixture in a pugmill, the pugmill output being delivered to the site of application.

A third process includes the steps of:
1. Separating the grossly oversized material from the detritus while it is in the transportation barge by an industrial rake and sending the oversize to the landfill;
2. Transporting the raked detritus to a site near the site of application, further screening the detritus to remove oversize material remaining within the detritus, said oversize material being transported to the landfill;
3. Then conditioning the raked and screened detritus with one or more of a group of pozzolanic and/or viscosioty improving ingredients and;
4. Grinding and mixing the detritus and the ingredients within a pugmill; and
5. Either storing the output of the pugmill prior to application or applying the pugmill output directly to the point of use.

BRIEF DESCRIPTION OF THE DRAWINGS

FIG. 7 shows the machine body raised to a level where the lowest part, the mixing drum is higher than the plane of the wheels. FIG. 8 shows the same machine with the entire machine body lowered, as if into the interior of a rail car.

FIG. 13 illustrates the process in which the barge carrying the untreated detritus has the grossly oversised material raked out and sent to the landfill. Further steps include mixing conditioning agents and a final grinding and mixing in a pugmill before application to a recovery site.

DETAILED DESCRIPTION OF THE INVENTION

Figure 1:
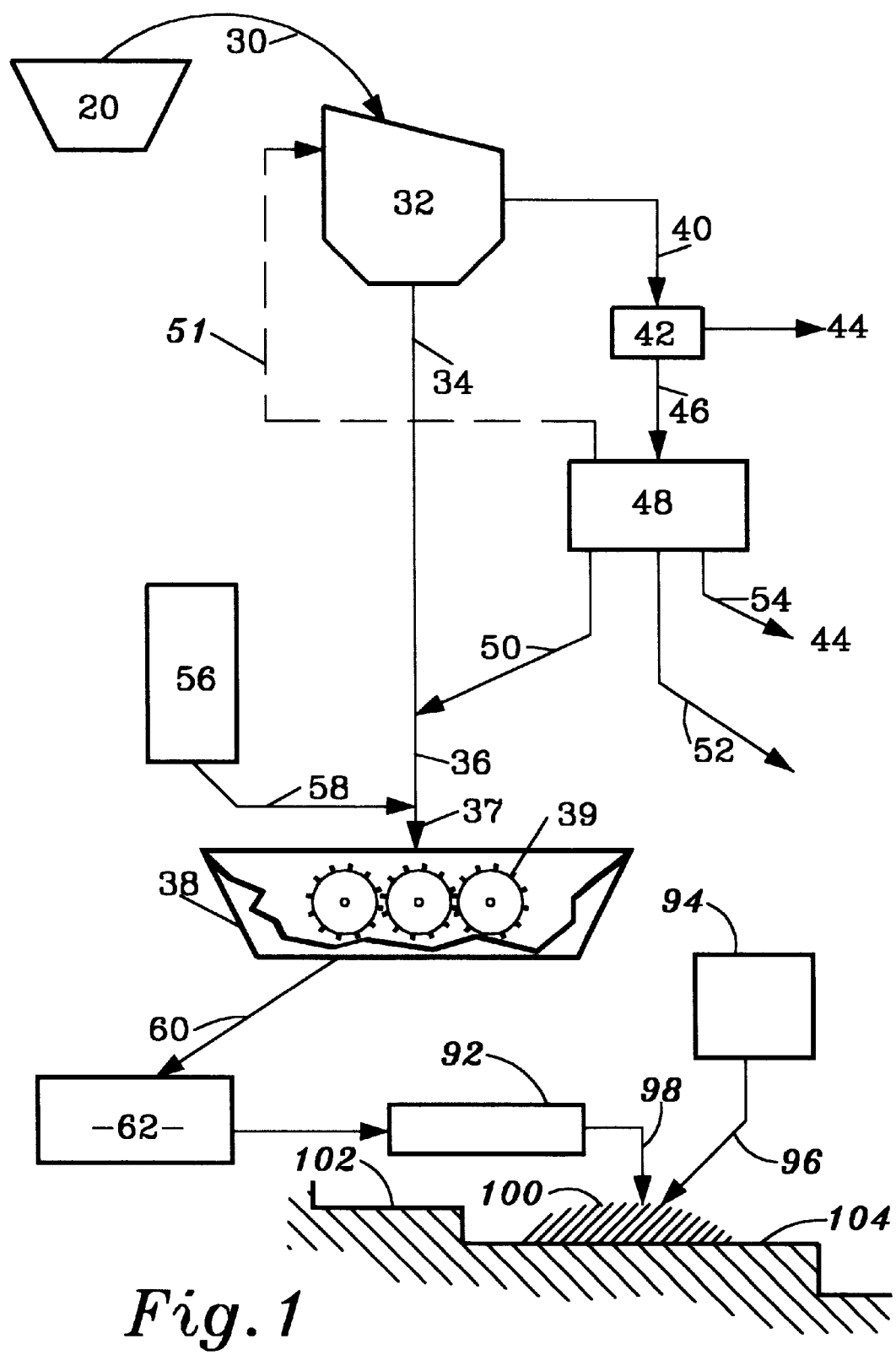
FIG. 1 shows one version of the waste process in which the final mixing before shipment is performed in a mixer external of a rail car and the mixture is transported to the site of use and mixed with a pozzolanic material.

Referring now to FIG. 1, there is shown barge 20 into which has been loaded detritus dredged from canals, rivers or lake beds. Such detritus contains "undersize" comprising silt, sand, stones and organic matter having maximum overall dimensions up to about eight inches, and "oversize" comprising all kinds of larger or oversize waste materials ranging from telegraph poles to rocks and abandoned automobiles. It is an objective of the treatment process to convert the dredge detritus to a first product which can be shipped in rail cars by processing the organic based oversize into a form is added to the undersize along with an additive or conditioner and mixing the three ingredients. The first product is transported to the site of use and there converted to a second product which is employed as material for the reconstruction of open pit mines and other environments.

To effectively employ the dredge detritus for this purpose it must first be conditioned for transportation, then it must be conditioned for the final application.

To achieve these objectives, it is necessary to separate the undersize material from the oversize material. Depending on the ultimate application for the processed material, the particle size range for undersize is from one inch to eight inches. Undersize material may include smaller metallic pieces, broken pieces of concrete, rocks plus the silt, sand and organic materials ordinarily found in silted-in flow streams.

To separate undersize material from oversize, the dredge detritus is conveyed from barge 20 by a crane 30 or other applicable means to a strong strainer machine 32, commonly called a grizzly. The grizzly 32 may have strainer bars within, whose distance of separation is adjustable, whereby the quality or maximum size of the pieces which traverse the grizzly can be controlled. The materials which pass through the strainer bars of the grizzly 32, the undersize, exit via flow path 34.

Oversize materials that do not succeed in traversing the grizzly 32 are rejected via path 40 to a diverter 42. The diverter 42 simply acts as a three-way valve. It diverts all the oversize material to a landfill via path 44 where the composition of the undersize emitted by grizzly 32 satisfies the mechanical requirements for its intended purpose and no augmentation is either required or tolerable. In the alternative, diverter 42 sends all the oversize via conduit 46 to a powerful grinder 48 which reduces the oversize to a size that will traverse grizzly 32. The grinder may include means for discriminating organic output from other output and thereby send metals to a metals recycle via path 52 and boulders and concrete to a landfill or crusher via path 54.

When the oversize organic material is conveyed from the diverter 42 to grinder 48 via path 46, grinder 48 reduces the oversize organic material to a particle size which would have successfully traversed grizzly 32.

In a preferred version of the invention the output of oversize grinder 48 is conveyed by path 50 to and joins with the output stream 34 of grizzly 32.

Grinder 48 requires a large amount of power. The smaller the particle size the grinder is called on to produce, the greater the power consumption, or in the alternative, the smaller the throughput. Typically a crusher/grinder will use three times as much power to produce a 1.5 inch average output size as a 3.0 inch average output size. This difference in power consumption may be represented also as a throughput ratio where a given crusher/grinder with fixed power input will have three times the throughput with an average 3-inch output size as with a 1.5 inch average output size. Further, a grinder with a specific setting will produce a range of sizes. Therefore, a crusher/grinder setting which will produce an output of which 95% will pass a given grizzly setting will have a much lower throughput than the same grinder so adjusted to produce an output of which only 50 percent will pass the same grizzly setting.

In an alternate power conserving mode of the invention, the grinder 48 is adjusted to produce a range of particle sizes, many of which are larger than would have passed the strainer bars of grizzly 32. In order to separate the oversize grinder output from the undersize, the output of grinder 48 is routed via path 51 back to grizzly 32. The oversize grinder output material rejected by grizzly 32 is recycled via paths 40 and 46 back to grinder 48 for regrinding along with the fresh oversize initially rejected by grizzly 32.

The ground-up oversize from grinder 48, having been added to the undersize emitted by grizzly 32 to form an aggregate, is conveyed further by conduit 36.

An additive is conveyed to conduit 36 from container 56 via conduit 58. The additive 56 may be a waste material such as ash from a coal or trash fired plant, or purchased material such as or lime cement or other pozzolanic material. However, the additive need not exhibit pozzolanic properties. The purpose of the additive is to increase the viscosity of the first product and to retain excess water within the product and minimize leakage from the transportation vehicle. Typically, depending on the fraction of water in the aggregate, 10 to 20 percent of additive will be required.

The undersize from grizzly 32, the pulp and ground oversize material from grinder 48 and the additive 56 are then conveyed via conduit 37 to a hopper 38 within which is positioned one or more mixing beaters 39. While the mixing beaters are depicted as drums having protruding agitators, any arrangement that provides a powerful mixing effect on heavy, wet, particle laden disparate material will function satisfactorily. The material having been thoroughly mixed within hopper 38, thereby forming mixture 60, the first product, is conveyed to railway car 62 for transportation to a location where it will be employed as a grading restorative for reclaiming abandoned mines or for any other purpose where low cost fill is required. In one such application the first product comprising the mixed material is off-loaded from railway car 62 to trucks 92 and carried thereby to the bench 104 of the pit mine having adjacent bench 102. A pozzolanic material 94 is conveyed to and spread in contact with the first product thereby forming an aggregate 100. The aggregate 100 is further mixed at the place of application as described below.

Figure 2:
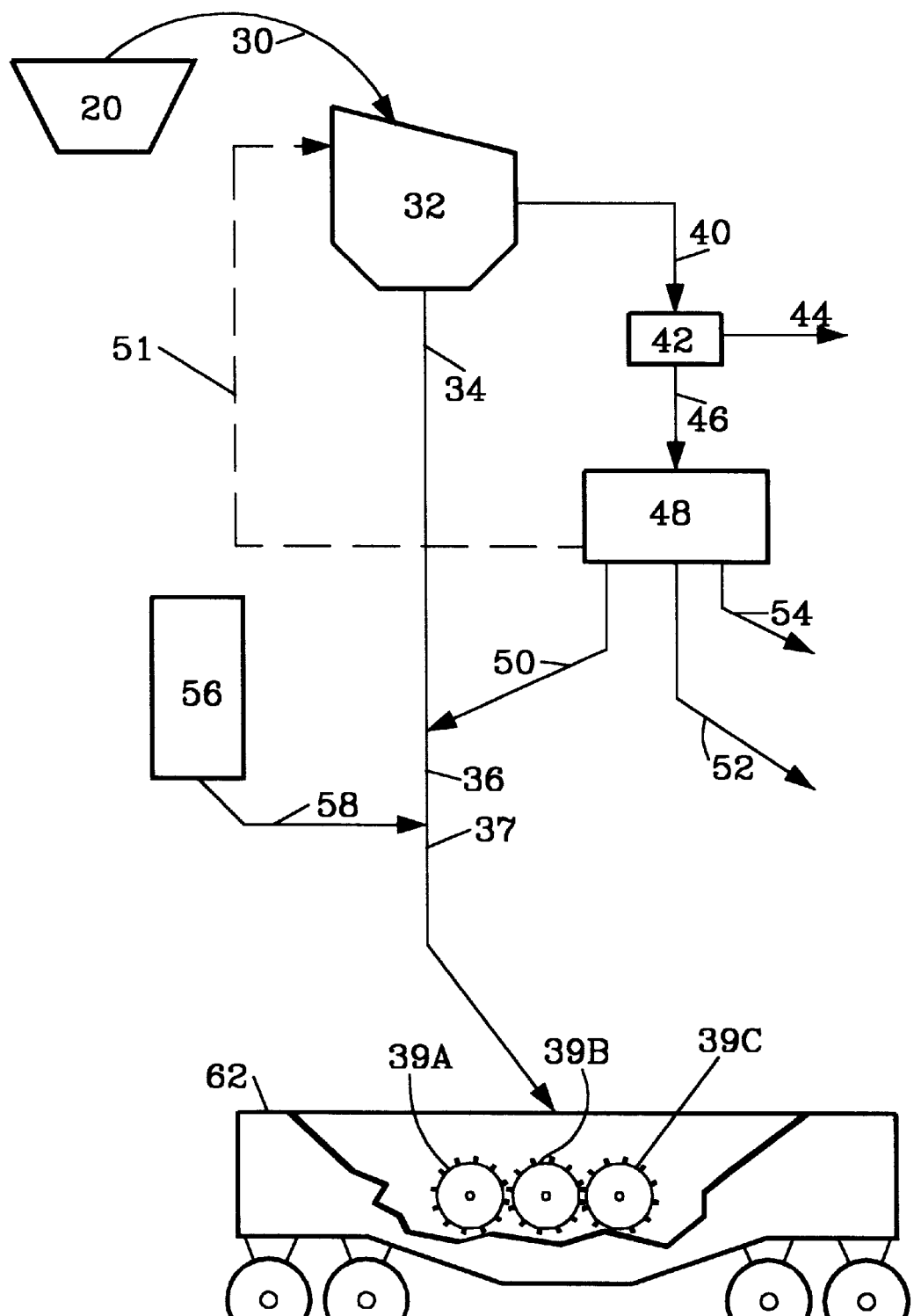
FIG. 2 shows a similar process where the final mixing before shipment is performed within the rail car employed for shipment.
Figure 3:
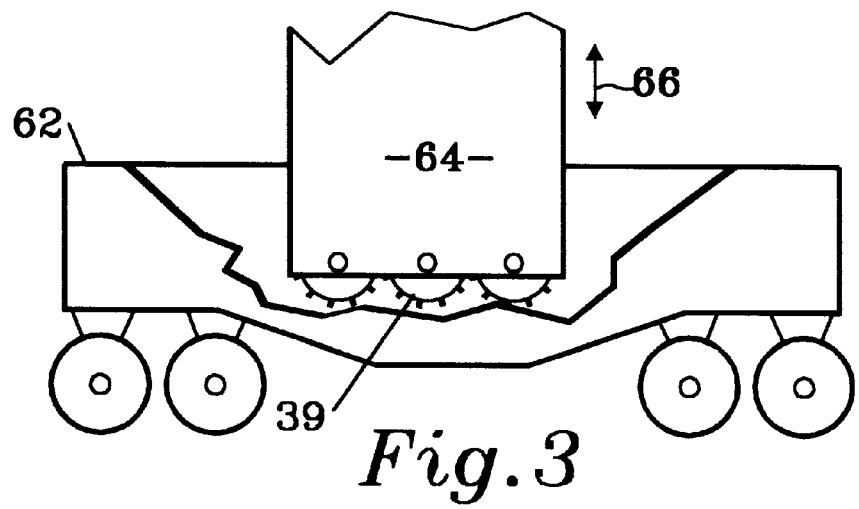
FIG. 3 shows a rail car with cut away sides, thereby displaying a raisable platen bearing rotary mixing drums.

FIG. 2 displays a similar process to that shown in FIG. 1 except that mixing hopper 38 has been omitted. In FIG. 2 the agglomeration of materials 37 is conveyed unmixed directly to railway car 62. One or more mixing drums 39 (A, B, C) are positioned within car 62. The mixing drums or elements 39 are then operated to mix, within car 62, the agglomeration 37 to form the first product. Either the mixing drum/s 39 may be moved from one end of car 62 interior to the other end or car 62 may itself be moved, keeping the mixing elements 39 stationary, to ensure that the mixing elements 39 are able to engage and mix the materials residing over the length of the car 62. The mixed product within car 62 then follows the same process as described in connection with product 60 in FIG. 1, Addressing FIG. 3, there is displayed car 62 with mixing element/s 39 mounted on a platen pair 64. Naturally two platens are required, one positioned at each end of the shaft mounted mixing elements 39. Platens 64 can be raised and lowered, 66, thereby allowing the mixing elements 39 to reach and mix every portion of the agglomeration within a given portion of the length of car 62. The platens 64, if longitudinally stationary, can reach every portion along the length of car 62 simply by causing the car 62 to move as required with respect to the platens and the mixing elements they bear. Further, since the platens 64, bearing mixing elements 39, can be raised as well as lowered, when the mixing function within car 62 has been completed, the platen 64 and its mixing elements can be raised to clear the top of the body of car 62, thereby allowing the car to be moved along the tracks, whereby an adjacent car filled with, as yet, unmixed material can be positioned under the mixing elements and subjected to the mixing action of the mixing elements 39.

Figure 4:
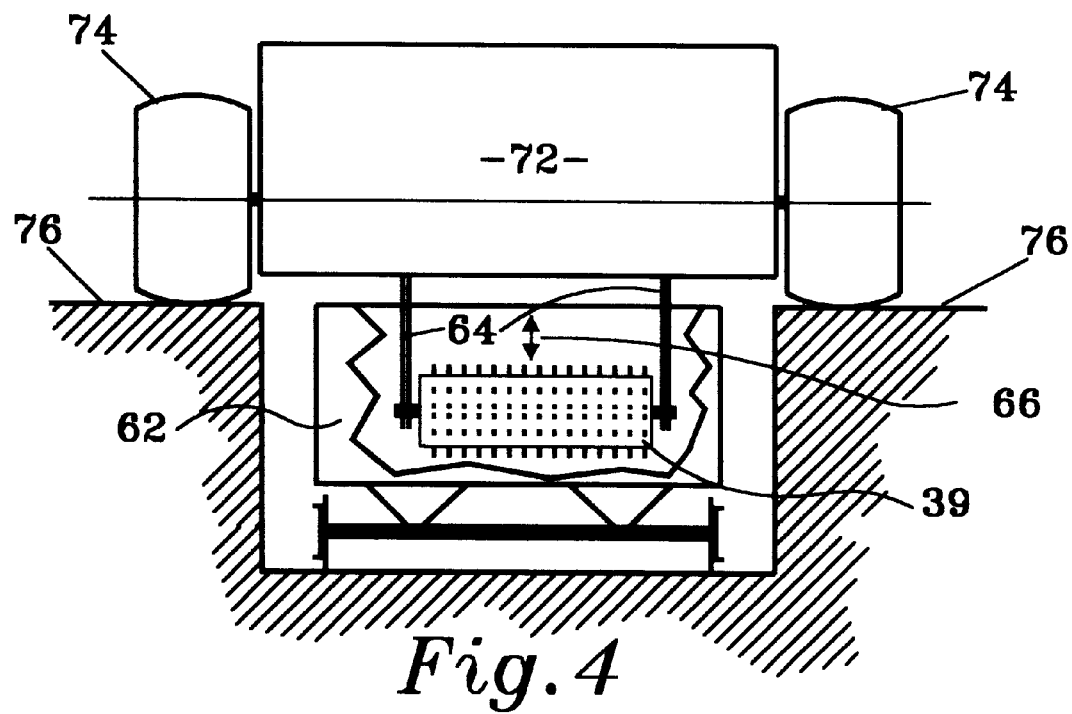
FIG. 4 illustrates a more complete wheeled machine positioned on a parapet level with the top of the rail car and with the raisable platen lowered into the rail car.

In FIG. 4 there is shown railway car 62 positioned within platforms 76. A machine 72, having four wheels 74, is positioned with its wheels 74 positioned on and supported by platforms 76. Within machine 72 are mechanisms which support platens 64. Mixing elements 39 are rotatably attached to the platens. Means for rotating the mixing elements 39, and for raising and lowering the platens 64 which bear them, are positioned within machine 72. The operator of machine 72 positions the machine 72 so that platens 64 with attached mixing elements 39 can be lowered into the interior of car 62. Thereafter the operator can move the machine on wheels 74 along the length of car 62, thereby addressing and mixing substantially every portion of the contents of car 62. When the mixing process has been completed, the operator raises platens 64 and either moves his machine 72 on wheels 74 along platforms 76 to position his mixing elements over another adjacent car, or the train operator performs the equivalent function by causing the rail car to move with respect to the machine 72, thereby allowing every car 62 within the train to have its contents mixed.

FIGS. 5, 6, 7, 8 and 9 are all directed to the design, the structure and the operation of machine 80 having machine body 82.

Figure 5:
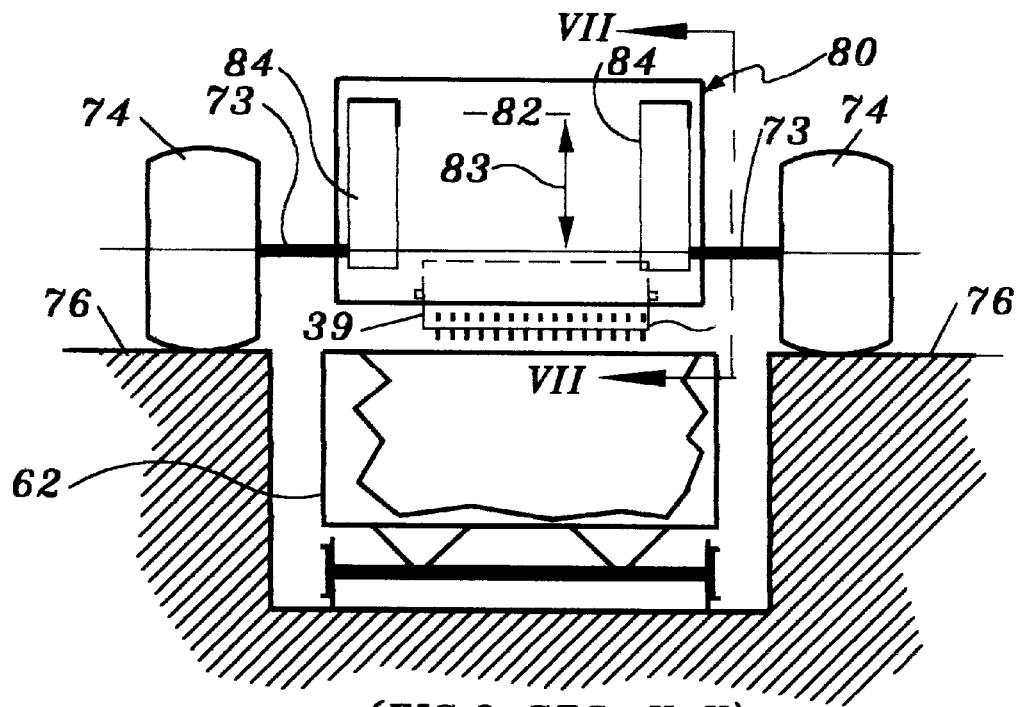
FIGS. 5 and 6 show an end view of a mixing machine having outboard wheels resting on a parapet, where the mixing wheel/s are fixed with respect to the body of the machine, but where the entire body is lowered into the interior of the rail car.
Figure 9:
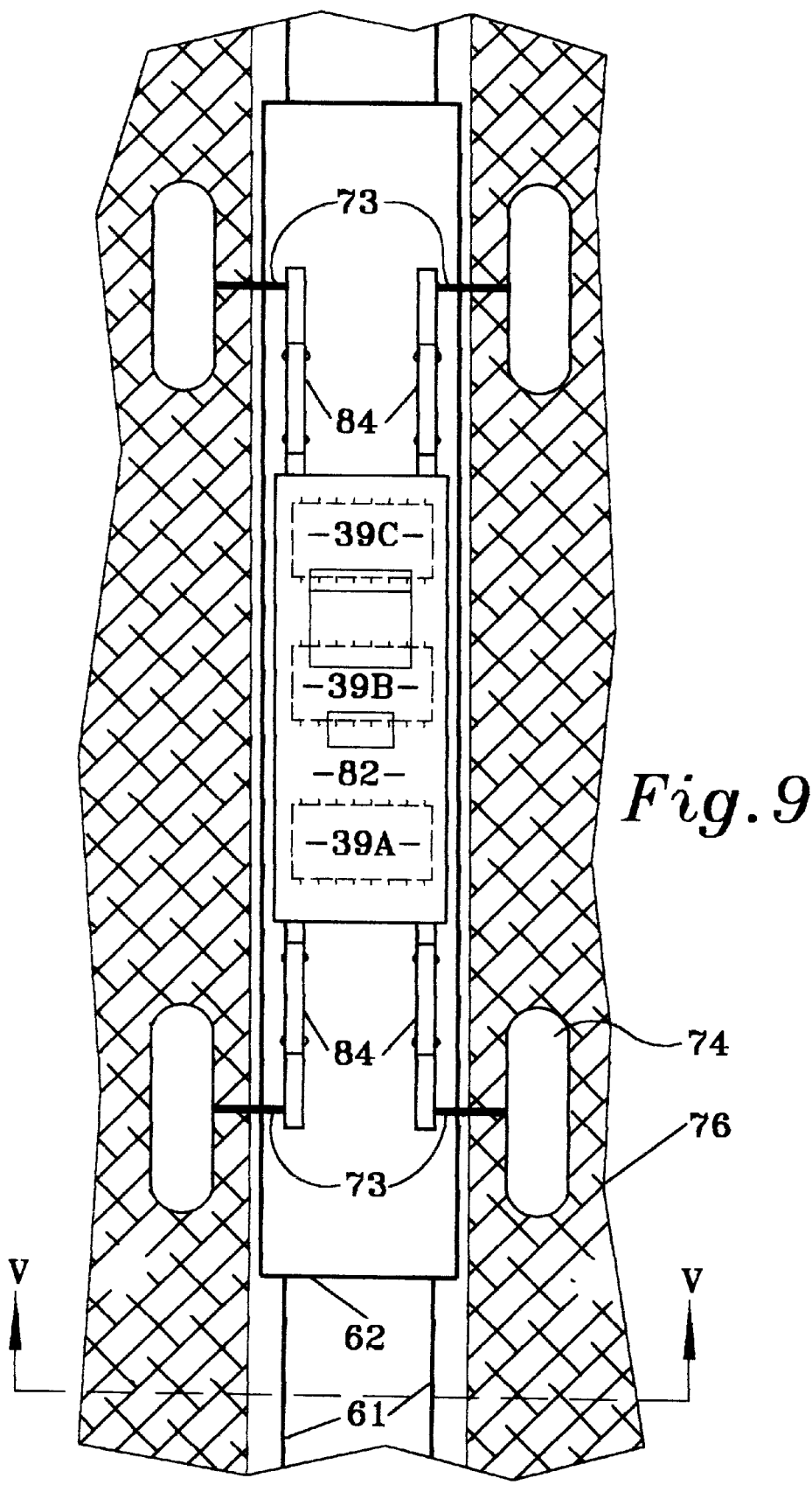
FIG. 9 is a plan view of the machine positioned on a parapet and over a rail car, demonstrating that the width of the machine body is less than the interior width of a rail car, while the outboard wheels allow the machine to move along the parapet.

FIG. 5, a section A—A of FIG. 9, shows a broken away portion of rail car 62 positioned within and between raised platforms 76. Typically, the levels of platforms 76 are the same and at substantially the same level as the top edge of car 62. Machine 80 comprising wheels 74 and machine body 82 bearing mixing drum 39 is positioned on platforms 76. Also machine body 82 is cantilever supported from wheels 74 by shafts 73. As shown in FIG. 9, rail car 62 is positioned with its interior substantially underneath the machine part or body 82 of machine 80. The width of the machine part 82 of machine 80 is less than the interior width or opening of rail car 62. Machine part 82 has a rotatable mixing drum 39 mounted so that a portion of the mixing drum 39 extends down, beneath the bottom of machine part 82. In that position it can effect a mixing action on material with which it is in contact. Other versions of the machine have more than one mixing drum. Machine part 82 is supported from wheels 74 by extended shafts 73.

Figure 6:
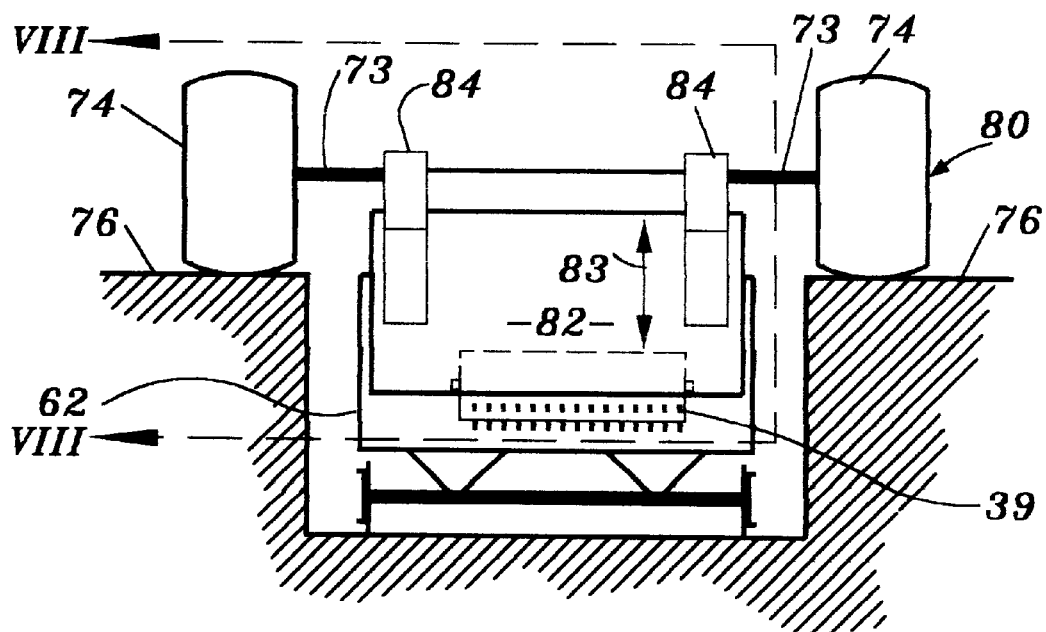

FIG. 6, (section A—A of FIG. 8) is similar to FIG. 5 except the entire end of rail car 62 has been cut away to show more clearly the positioning of the machine 82 when it is lowered into the rail car for the purpose of performing its mixing function on the car contents. In FIG. 6 machine 82 has been lowered bodily into the interior of rail car 62, thereby exposing the contents of the rail car to the mixing action of mixing drum 39. While mixing drum 39 is shown having a width less than machine body 82, it is most effective when the drum 39 is as wide as machine body 82. The machine 82 can be raised and lowered as indicated by arrow 83 through the action of the hydraulic support arms 84. By reference to FIGS. 5, 6 and 9 it can be seen that extended shafts 73 engage hydraulic arms 84.

Figure 7:
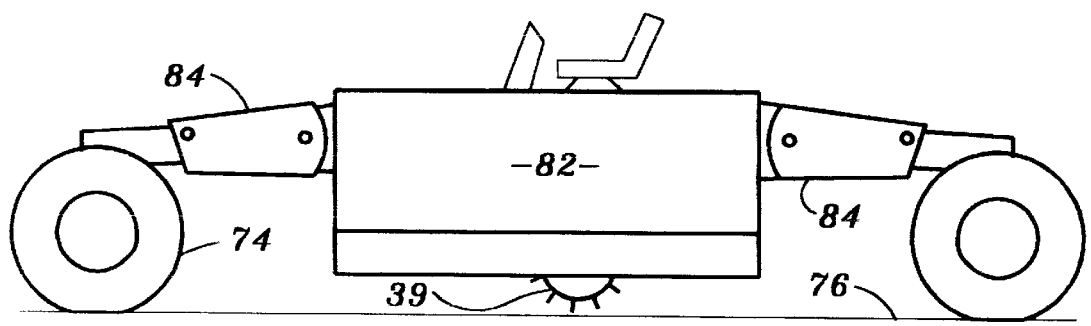
FIGS. 7 and 8 illustrate side views of the machine.
Figure 8:
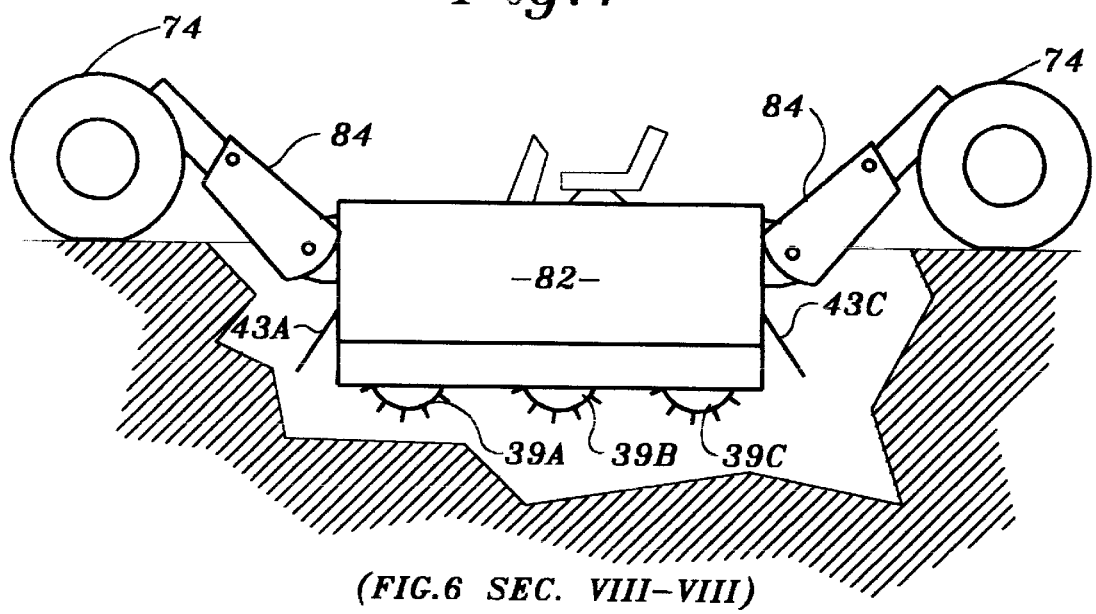

By reference to FIGS. 7 and 8 it can be seen that the hydraulic arms 84 both support machine part 82 and, through actions by an operator, can be caused to raise and lower machine part 82. Machine part 82 has a seat and operating controls for an operator. The operator can raise and lower the machine, control the selection and speed of the mixing drums and cause the wheels 74 to rotate, thereby causing the machine 82 and supporting appurtenances to move from one end of a car to the other end and, with the machine 82 raised, from one car to another. In its raised position the lowest portion of mixing drum/s 39 is above the level of platforms 76 and above the top of the sides of car 62. In its lowered position the level of the mixing drum/s can be adjusted to conform to the floor of the rail car.

In its simpler manifestation machine 82 has only a single mixing drum 39. In a more complex construction at least two mixing drums 39A and 39C are provided. The operator can manually control the drum speed and direction of rotation.

Referring again to FIG. 8, where engine power is limited and sufficient to drive only a single mixing drum, the transmission is provided with an interlock which causes only the mixing drum to rotate which is at the leading edge of the linear motion of the machine. That is, when the operator causes the machine to move to the left, drum 39A is caused to rotate and drums 39B and 39C left idle. When the machine is caused to move to the right, then drums 39A and 39B are left unpowered and only mixing drum 39C is caused to rotate. This improvement allows the mixing to be effectuated close to the interior ends of the car, even when there is limited power to drive two or more mixing drums.

FIG. 8 also illustrates levers 43A and 43C, each located at the end of the machine body adjacent the mixing drum having the same suffix letter. These levers provide the drum controlling function when the machine/body 82 is stationary and the car 62 is caused to move relative to the machine. Then when car 62 moves to the left, lever 43C is depressed, causing only mixing drum 39C to rotate. Should the car 62 move to the right, then lever 43C is released stopping mixing drum 39C, but lever 43A is depressed, thereby causing operation of mixing drum 39A.

In FIG. 9 there is shown a plan view of the platforms 76, the rail car 62 with rails 61, the machine body 82 supported by hydraulic arms 84 and, in turn, through cantilever shafts 73, by wheels 74 resting upon the platform 76, machine 82 having three mixing drums 39A, 39B and 39C positioned underneath. This method and the machine therefor, prepares material for shipment.

Figure 10:
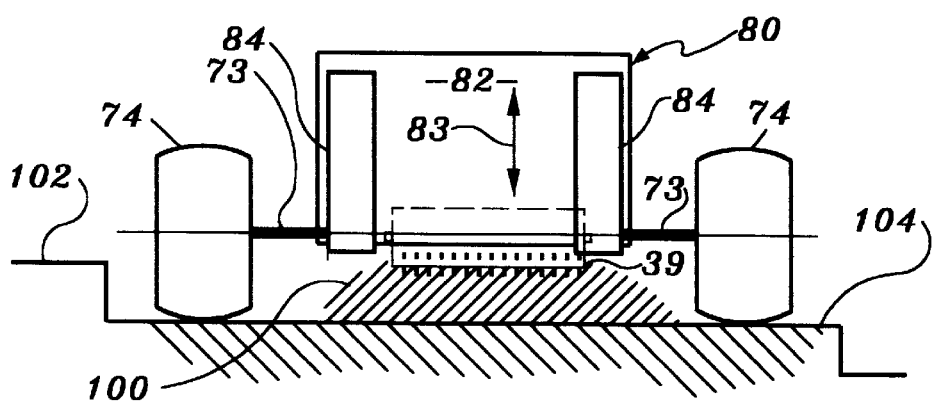
FIG. 10 illustrates the use of the mixing machine of FIG. 5 and 6 for mixing the ingredients at the site of application.

FIG. 10 displays the mixing machine 80 of FIGS. 5 and 6 located at a pit bench 104 of a pit mine reclamation site.

Machine 80 is positioned with its wheels 74 astride the layers of aggregate 100; the components of which are the first product and the pozzolanic material from source 94 (FIG. 1). The mixing machine 80 is caused to traverse the aggregate causing the aggregate components to be mixed, thereby forming a second product. The second product is compacted by rollers or compacting machine.

Figure 11:
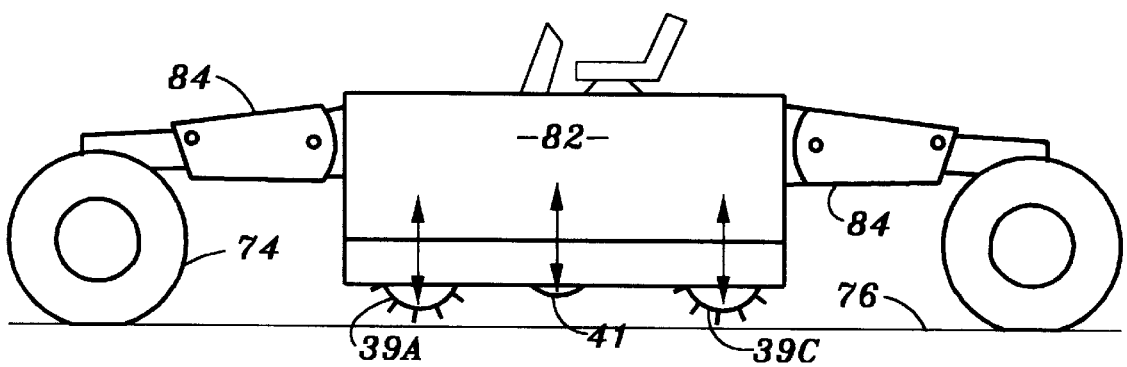
FIG. 11 is a side elevation of the mixing machine showing two mixing drums plus a rolling/compacting drum, each of which can be independently raised and lowered.

In an alternate construction of machine 82 shown in FIG. 11 there is shown two mixing drums 39A and 39C positioned at opposite ends of machine body 82 and a roller or compacting drum 41 positioned between the two mixing drums. The machine is equipped with means for raising the roller drum 41 during a mixing operation in one mode and raising the mixing drums and lowering the roller drum 41 when compacting is required.

Figure 12:
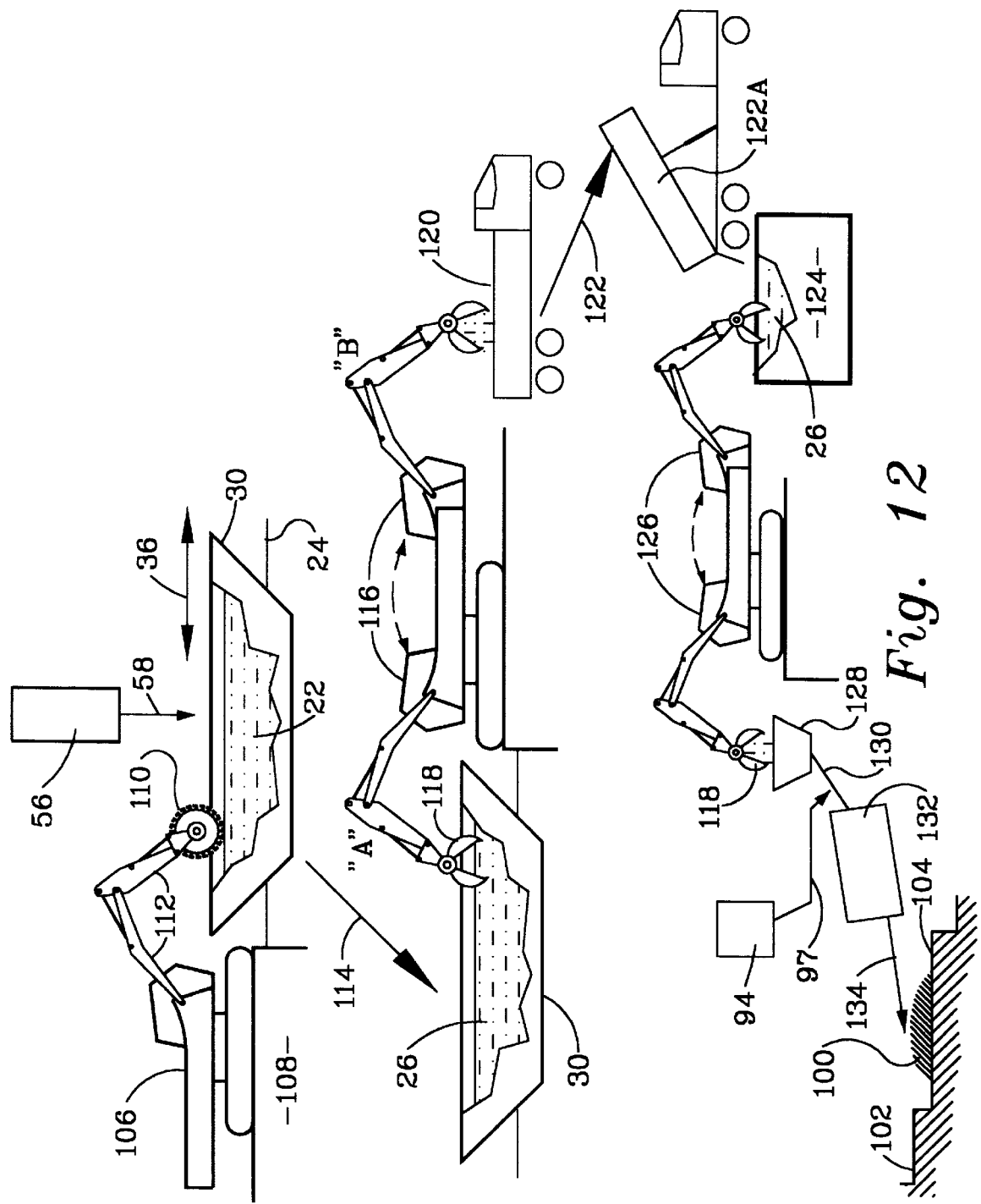
FIG. 12 shows a depiction of the process in which the first step provides that the detritus and any oversize material contained therein is ground directly within the transporting barge while the viscosity improver is simultaneously mixed into and with the detritus.

In FIG. 12 there is shown barge 30 floating on a body of water 24. Within the barge 30 is a body of detritus 22 which has been dredged from the body of water or from another place. Contained within detritus 22 are solids having a range of sizes, including some material having dimensions greater than are suitable for a specific application. In order to best prepare the detritus for use as reconstruction material or other purposes, a powered rotating grinding drum 110, mounted on extendable, hydraulicly actuated arms 112 is employed to traverse the interior of barge 30 thereby grinding and reducing the size of oversize materials. The arms 112 are, in turn, supported, energized and controlled by a swiveling excavator type machine, typically moveable on endless tracks which are positioned on dock or curb 108.

In the event the arms 112 are not sufficiently extensible or do not have sufficient range of motion to provide access to all parts of barge 30 and its contents 22 by grinding wheel 110, the barge is moved back and forth along path 36 to ensure such access.

Prior to and during the grinding process additive 56 is conveyed from its container to detritus 22 via conduit 58. The purpose of the additive is to increase the viscosity of the first product and to retain excess water within the product and minimize leakage from the transportation vehicle. Typically, depending on the fraction of water in the aggregate, 10 to 20 percent of additive will be required. The action of grinding drum 110 serves also as a mixer, thereby distributing and mixing additive 56 throughout the body of detritus 22.

The mixing and grinding process having been completed, barge 30, with its ground and stabilized contents 26, is moved via path 114, to a site adjacent an unloading mechanism. Displayed in FIG. 12 is rotatable, hydraulically-actuated excavator 116, having buckets 118. In position "A" the excavator is turned to allow buckets 118 to access the contents of barge 30. When the buckets are filled, excavator 118 is rotated to position "B" where the contents of buckets 118 are transferred to truck 120. Trucks 120, filled with treated dredge detritus 26, transposrt the material via path 122 to a site where they are unloaded, typically by tilting the truck body at 122A, into detritus reservoir 124. Other mechanisms for moving the detrutus from the barge to trucks or railway cars may be employed.

When site reconstruction material is required, a transmporting mechanism 126, otherwise substantially identical to bucket-equipped excavator 116, is employed to move the stored detritus 26 to hopper 128. From hopper 128 the detritus is fed via conduit 130 into pugmill grinder-mixer 132. Enroute to pugmill 132, pozzolanic material 94 is fed, as required, via conduit 97 to conduit 130. The detritus 26 and the pozzolanic material 94 are thoroughly mixed during the grinding process and emerge via conduit 134, suitable for placement as product 100 on bench 102 or 104.

A pugmill typically is constructed as a trough, or a cylinder designed to withstand relatively high pressures within which a single shaft or a pair of parallel shafts, carrying a series of short stout paddles, revolve. The shafts are frequently driven by separate motors. The paddles are angled to approximate propeller form and may be sharpened to provide cutting as well as mixing action. The angled paddles act to transport the mixture gradually from the pugmill inlet to its outlet cutting and kneading the material in transit. The axis of the mill may be horizontal, pitched or vertical.

FIG. 13 displays the path of detritus from barge to bench via a different process. In FIG. 13 the raw detritus 22 is raked by coarse rake 138 positioned at the end of the moveable arms of an hydraulically actuated excavator or the like. Coarse or oversized material separated from the detritus 22 by the rake are transferred to truck 12 as the excavator rotates from position "A" to position "B". Truck 120 carries the oversize material removed by rake 138 to a landfill 44 or another point of waste disposal or utilization.

The barge, having had the coarse portion of its contents removed by the raking process, move along path 114 to a position near the place where the detritus will be employed for its ultimate purpose. At that position, the detritus is unloaded directly into grizzly 118 which further separates oversize material from undersize. While clam-bucket excavator 126 is illustrated for this purpose, other convenient means for performing the unloading process may be employed.

The oversized material separated by the grizzly is delivered to a landfill 44. The remaining undersize material enters hopper 128 via path 34. Hopper 128 provides a flywheel-like flow reservoir from which pugmill 132 is supplied with material via conduit 130.

Separate reservoirs for different additives 94A, 94B and 94C are provided, positioned and arranged to feed the stored additives as required into the flow stream from hopper 128 to pugmill 132. At least one of the additives has pozzolanic properties. The other additives may function both to change product viscosity and to act symbiotically with other additives to reduce the amount required to secure the desired properties.

The detritus, now a final desired product, transferred via path 134 to temporary storage 140. Usual means of transfer 134 are applied to transfer the stored product 140 to the application site 104 as product 100.

From the foregoing description it can be seen that the present invention comprises advanced systems for processing dredge detritus and an improved machine for mixing dredge detritus and additives within the same rail car to be employed for shipping the processed detritus to its ultimate destination. It will be appreciated by those skilled in the related arts that changes could be made to the manifestations of the invention described in the foregoing description without departing from the broad inventive concepts embodied therein. I intend, therefore, that the protection provided by this patent is not to be limited to the particular manifestations or embodiments of the inventions disclosed but to cover all modifications and equivalents thereof and equivalents of specific elements which are within the scope and spirit of the inventions as defined by the appended claims as interpreted by the above disclosure.

I claim:

1. A process for treating dredge detritus material from a source comprising the steps of:

establishing a limiting particle dimension, causing some detritus material from the source to pass through a first size separating process, whereby detritus material having a particle dimension larger than the limit, being a first larger sized particle portion, is separated from the detritus material having a particle dimension smaller than the limit, being a first smaller sized particle portion, grinding the first larger sized particle portion to produce a first intermediate product including a portion having some particle dimensions smaller than the limit, being a second smaller sized particle portion, and a portion having particle dimensions larger than the limit, being a second larger sized particle portion, causing the first intermediate product to flow through a second size separating process, thereby separating the smaller sized particle portion of the intermediate product, being a second smaller sized particle portion, from the larger sized particle portion of the intermediate product, being the second larger sized particle portion, adding the second smaller sized particle portion of the intermediate product to the first smaller sized particle portion, adding a stabilizer ingredient to said first and second smaller sized particle portions, further providing that said stabilizer ingredient is selected from the group consisting of fly ash, ash residue, ash residue from a coal burning furnace and cement, mixing together the first smaller sized particle portion, the second smaller sized particle portion and the stabilizer, thereby forming a first mixture, combining the second larger sized particle portion with the dredge detritus source material, and further providing that the mixing process includes the step of placing the substantially unmixed materials within a railway car having an interior width, positioning the railway car between two platforms, providing a wheeled mixing machine having a machine body having a leading end and a trailing end, said machine body having a width less than the interior width of the railway car, the body comprising a mixing drum and power source, the body being moveable on wheels positioned on the platforms, the mixing machine being provided with means for lowering the body into the interior of the railway car, whereby the contents are mixed, and raising the body above the railway car, thereby allowing the railway car to be removed from under the machine.

2. A process as recited in claim 1 further providing that the mixing body includes two mixing drums.

3. A process as recited in claim 2 where one mixing drum is positioned at the leading end and the other one is positioned at the trailing end of the machine body.

4. A process as recited in claim 3 where motion of the machine in one direction causes the drum at the leading end of the machine body to rotate and the drum at the trailing end of the machine body to stop rotating.

5. A process as recited in claim 3 further providing pressure actuated means positioned at each end of the machine body for causing the mixing drum adjacent the actuated means to operate and the other drum to stop when the means is actuated.

6. A process as recited in claim 1 further providing means for rotating the wheels of the mixing machine, thereby providing means for moving the mixing machine body along the interior of the stationary railway car.

7. A process as recited in claim 6 further including the step of transporting the first mixture to an application site and spreading the first mixture over the area of the application site, spreading a pozzolanic material over the first mixture and mixing the pozzolanic material with the first mixture to form a second mixture.

8. A process as recited in claim 6 further providing that the mixing process is performed by a mixing machine having outboard wheels supporting a machine body having a powered mixing drum positioned in part below the body.

9. A process as recited in claim 8 further providing that the mixing machine includes a mixing drum and a roller drum and means for moving one or the other into an operative position.

10. A process as recited in claim 8 further providing a mixing drum and a compacting drum and means for lowering only one into an operative position with respect to the body.

11. A process as recited in claim 11 further providing that the group from which the stabilizer material is selected includes a pozzolanic material.

12. A process for treating dredge detritus material from a source comprising the steps of:

establishing a limiting particle dimension, causing some detritus material from the source to pass through a first size separating process, whereby detritus material having a particle dimension larger than the limit, being a first larger sized particle portion, is separated from the detritus material having a particle dimension smaller than the limit, being a first smaller sized particle portion, grinding the first larger sized particle portion to produce a first intermediate product including a portion having some particle dimensions smaller than the limit, being a second smaller sized particle portion, and a portion having particle dimensions larger than the limit, being a second larger sized particle portion, causing the first intermediate product to flow through a second size separating process, thereby separating the smaller sized particle portion of the intermediate product, being the second smaller sized particle portion, from the larger sized particle portion of the intermediate product, being the second larger sized particle portion, adding the second smaller sized particle portion of the intermediate product to the first smaller sized particle portion, adding a stabilizer ingredient to said first and second smaller sized particle portions, further providing that said stabilizer ingredient is selected from the group consisting of fly ash, ash residue, ash residue from a coal burning furnace and cement, mixing together the first smaller sized particle portion, the second smaller sized particle portion and the stabilizer, thereby forming a first mixture, combining the second larger sized particle portion with the dredge detritus source material, and further providing that the mixing process includes the step of placing the substantially unmixed materials within a container having an interior width, positioning the container between two platforms, providing a wheeled mixing machine having a machine body having a leading end and a trailing end, said machine body having a width less than the interior width of the container, the body comprising a mixing drum and power source, the body being moveable on wheels positioned on the platforms, the mixing machine being provided with means for lowering the body into the interior of the container whereby the contents of the container are mixed, and raising the body above the container thereby allowing the relative positions of the container and the mixing machine to be changed.

13. A process as recited in claim 12 where the container is equipped with wheels adapted for use on rails and raising the body above the the container allows the wheeled container to be removed from under the machine.

14. A process for treating dredge detritus material from a source comprising the steps of:

establishing a limiting particle dimension, causing some detritus material from the source to pass through a first size separating process, whereby detritus material having a particle dimension larger than the limit, being a first larger sized particle portion, is separated from the detritus material having a particle dimension smaller than the limit, being a first smaller sized particle portion, grinding the first larger sized particle portion to produce a first intermediate product including a portion having some particle dimensions smaller than the limit, being a second smaller sized particle portion, and a portion having particle dimensions larger than the limit, being a second larger sized particle portion, causing the first intermediate product to flow through a second size separating process, thereby separating the smaller sized particle portion of the intermediate product, being the second smaller sized particle portion, from the larger sized particle portion of the intermediate product, being the second larger sized particle portion, adding the second smaller sized particle portion of the intermediate product to the first smaller sized particle portion, adding a stabilizer ingredient to said first and second smaller sized particle portions, further providing that said stabilizer ingredient is selected from the group consisting of fly ash, ash residue, ash residue from a coal burning furnace and cement, mixing together the first smaller sized particle portion, the second smaller sized particle portion and the stabilizer, thereby forming a first mixture, combining the second larger sized particle portion with the dredge detritus source material, and further providing that the mixing process includes the step of placing the substantially unmixed materials within a container, positioning the container between two platforms, providing a mixing machine positioned on at least one platform, the mixing machine having a first mixing drum and a power source, the mixing machine being provided with means for lowering the mixing drum into the interior of the container, whereby the contents of the container are mixed, and raising the mixing drum above the container, thereby allowing the relative positions of the container and the mixing machine to be changed.

15. A process for treating dredge detritus as recited in claim 14 further providing that the mixing machine is positioned on both platforms.

* * * * *